(12) United States Patent
Song et al.

(10) Patent No.: US 9,245,579 B2
(45) Date of Patent: Jan. 26, 2016

(54) TWO-DIMENSIONAL MAGNETIC RECORDING READER OFFSET ESTIMATION

(71) Applicant: LSI Corporation, San Jose, CA (US)

(72) Inventors: Xiufeng Song, San Jose, CA (US); Eui Seok Hwang, Palo Alto, CA (US); George Mathew, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 49 days.

(21) Appl. No.: 14/180,329

(22) Filed: Feb. 13, 2014

(65) Prior Publication Data

US 2015/0187384 A1  Jul. 2, 2015

Related U.S. Application Data

(60) Provisional application No. 61/921,271, filed on Dec. 27, 2013.

(51) Int. Cl.
G11B 20/10 (2006.01)

(52) U.S. Cl.
CPC .... *G11B 20/10046* (2013.01); *G11B 20/10037* (2013.01); *G11B 20/10388* (2013.01)

(58) Field of Classification Search
None
See application file for complete search history.

(56) References Cited

U.S. PATENT DOCUMENTS

| | | | | |
|---|---|---|---|---|
| 4,388,656 A * | 6/1983 | Lemke | | 386/273 |
| 5,202,821 A * | 4/1993 | Bauck et al. | | 700/42 |
| 5,274,569 A * | 12/1993 | Prasad | | 702/66 |
| 5,499,226 A * | 3/1996 | Ohta et al. | | 369/59.19 |
| 5,633,846 A * | 5/1997 | Okuyama et al. | | 369/44.34 |
| 5,926,489 A * | 7/1999 | Luthi et al. | | 375/346 |
| 5,943,427 A * | 8/1999 | Massie et al. | | 381/17 |
| 6,369,974 B1 * | 4/2002 | Asgari et al. | | 360/78.14 |
| 6,560,059 B1 * | 5/2003 | Hsin et al. | | 360/78.04 |
| 7,486,747 B1 * | 2/2009 | Bagley et al. | | 375/324 |
| 8,217,812 B2 * | 7/2012 | Wang et al. | | 341/61 |
| 2009/0262947 A1 * | 10/2009 | Karlsson et al. | | 381/17 |

(Continued)

OTHER PUBLICATIONS

George Mathew et al., "Capacity Advantage of Array-Reader Based Magnetic Recording for Next Generation Hard Disk Drives," Digests of the 24th Magnetic Recording Conference TMRC 2013, Aug. 20-22, 2013, pp. i-ii, 1, and 58-59.

Nuno Miguel De Figueiredo Garrido, "Available Techniques for Magnetic Hard Disk Drive Read Channel Equalization," NM de Figueiredo Garrido, Jul. 8, 2013, pp. 1-13.

(Continued)

*Primary Examiner* — Peter Vincent Agustin

(57) ABSTRACT

A method for enhancing read performance in a multi-reader two-dimensional magnetic recording system comprising first and second readers includes: receiving first and second analog read signals from the first and second readers, respectively; sampling the first and second analog read signals to generate first and second sampled signals, respectively, each of the first and second sampled signals comprising an integer component, indicative of a value of a corresponding one of the first and second analog read signals, respectively, at an integer multiple of a corresponding sampling period associated therewith, and/or a fractional component, indicative of a value of the corresponding one of the first and second analog read signals, respectively, at an arbitrary point in time between integer multiples of the corresponding sampling period; and combining the integer and/or fractional components of the respective first and second sampled signals to thereby generate a reader offset estimation signal.

22 Claims, 8 Drawing Sheets

(56) References Cited

U.S. PATENT DOCUMENTS

2011/0063752 A1* 3/2011 Fasen .............................. 360/83
2015/0022916 A1* 1/2015 Zou et al. ........................ 360/31

OTHER PUBLICATIONS

Chan Kheong Sann, "Channel Models and Detectors for Two-Dimensional Magnetic Recording (TDMR)," IEEE Trans. Magn., vol. 46, No. 3, pp. 804-811, 2010.

* cited by examiner

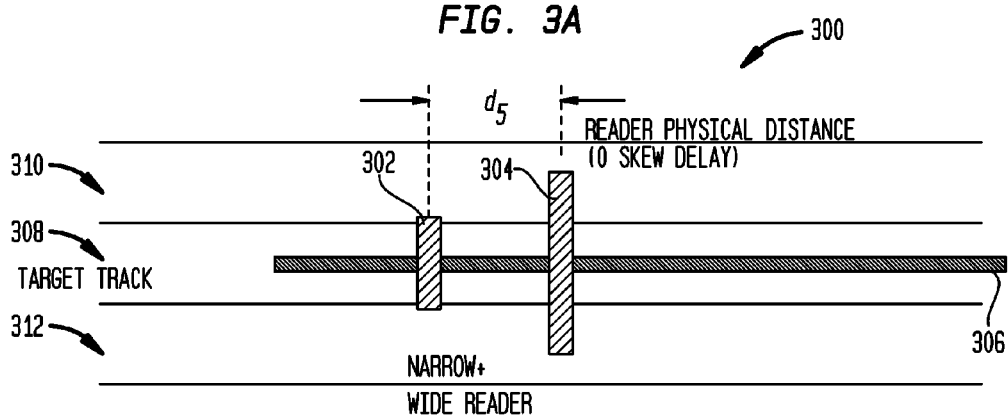
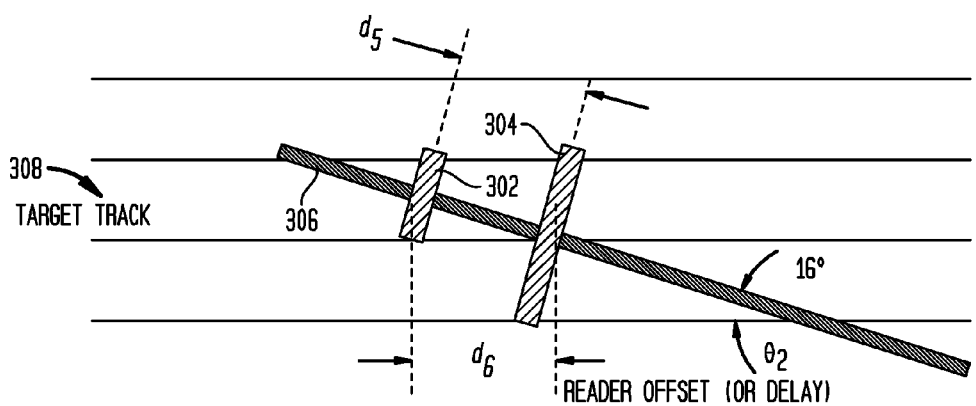
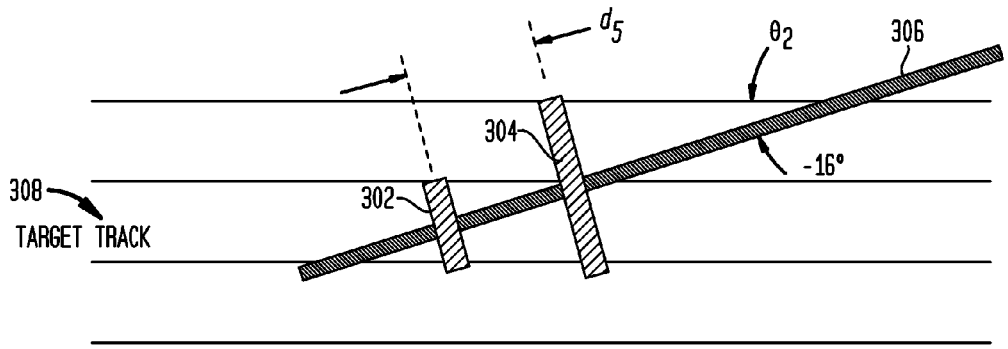

TWO-DIMENSIONAL MAGNETIC RECORDING READER OFFSET ESTIMATION

CROSS-REFERENCE TO RELATED APPLICATION(S)

This application claims priority to U.S. Provisional Application No. 61/921,271, filed Dec. 27, 2013, which is incorporated by reference herein in its entirety.

TECHNICAL FIELD

The present invention relates generally to electrical and electronic circuitry, and more particularly relates to magnetic recording.

BACKGROUND

Two-dimensional magnetic recording (TDMR) is a recording architecture intended to support storage densities beyond those of conventional recording systems. TDMR reads from one or more adjacent tracks to decode the signal from a target track. The gains achieved from TDMR come primarily from joint processing of multiple readback signals using powerful coding and signal processing algorithms which allow data bits to be stored more densely on a magnetic storage medium (e.g., disk). In a traditional disk architecture with a single read head, collection of multiple readback signals to facilitate the joint processing would require additional disk rotations. To circumvent this problem, TDMR disk drives may use multiple readers assembled on the same support arm, typically referred to as a slider, thus restoring traditional read service times.

Densely packed disks utilize narrower tracks. To achieve narrower tracks, one may use shingled writing, where each sweep of the write head overlaps a certain percentage of the previous track. Shingled writing may be used without two-dimensional readback at lower densities. However, as the shingling gets more aggressive, one-dimensional codes and detectors will eventually no longer be able to handle inter-track interference (ITI) coming from adjoining tracks. In one-dimensional channels, ITI leads to a performance loss. With two-dimensional channels, ITI assists in making a data decoding decision (i.e., logical assignment) for a given bit.

One disadvantage of using a multi-reader approach is that there is an inherent offset (i.e., delay) between read signals obtained from the respective readers due, at least in part, to the physical distance—down-track and/or cross-track—separating the readers. The physical distance between readers causes the offset between read signals, which needs to be compensated for efficient TDMR signal processing. Although manufacturers may provide the physical distances between the multiple readers, actual offset between read signals obtained from the respective readers can vary based on many factors, including, but not limited to, temperature, fly-height variation, read head misalignment, physical damage, physical vibration, skew angle, etc. Because of these various factors, estimating the actual offset between readers can be challenging.

SUMMARY

In accordance with an embodiment of the invention, a method for enhancing read performance in a multi-reader TDMR system including first and second readers includes: receiving first and second analog read signals from the first and second readers, respectively; sampling the first and second analog read signals to generate first and second sampled signals, respectively, each of the first and second sampled signals comprising an integer component, indicative of a value of a corresponding one of the first and second analog read signals, respectively, at an integer multiple of a corresponding sampling period associated therewith, and/or a fractional component, indicative of a value of the corresponding one of the first and second analog read signals, respectively, at an arbitrary point in time between integer multiples of the corresponding sampling period; and combining the integer and/or fractional components of the respective first and second sampled signals to thereby generate a reader offset estimation signal. Other embodiments of the invention include but are not limited to being manifest as a TDMR reader offset estimation apparatus, either by itself or fabricated as part of an integrated circuit which may include other circuits and/or components, and an electronic system. Additional and/or other embodiments of the invention are described in the following written description, including the claims, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIGS. 3A through 3C are top plan views of at least a portion of an illustrative multi-reader TDMR system conceptually depicting an effect of a combination of wide and narrow readers on offset estimation;

Figure 1A:
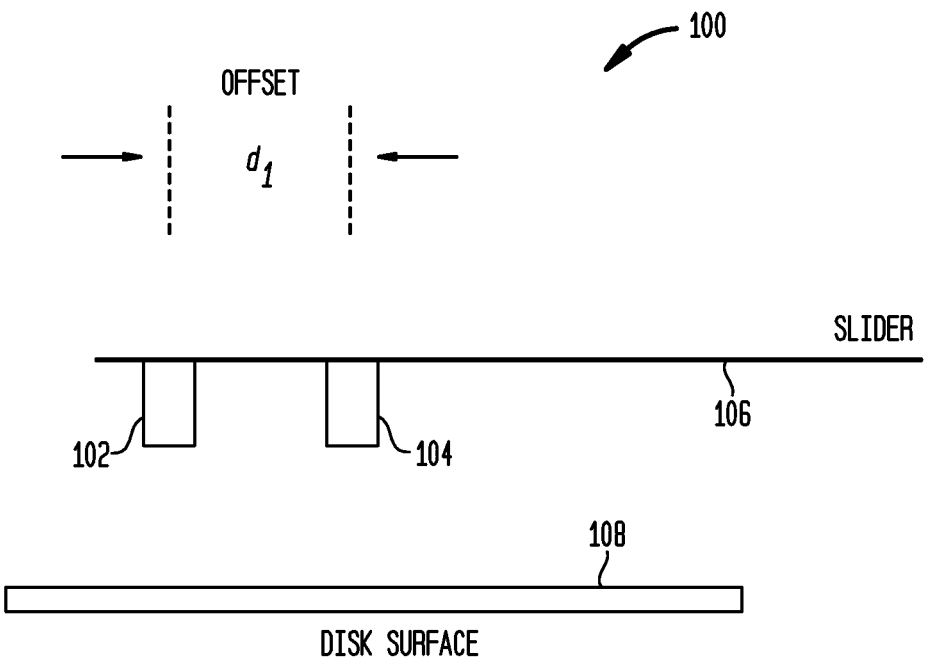
FIGS. 1A and 1B are side views of at least a portion of an illustrative multi-reader TDMR system conceptually depicting an effect of read head clearance (i.e., fly-height) variation on offset estimation.

It is to be appreciated that the drawings described herein are presented for illustrative purposes only. Moreover, common but well-understood elements and/or features that may be useful or necessary in a commercially feasible embodiment may not be shown in order to facilitate a less hindered view of the illustrated embodiments.

DETAILED DESCRIPTION

Embodiments of the invention will be described herein in the context of illustrative TDMR systems for use, for example, in a data storage application. It should be understood, however, that embodiments of the invention are not limited to these or any other particular TDMR arrangements. Rather, embodiments of the invention are more broadly applicable to techniques for improving read performance of a magnetic storage device. In this regard, embodiments of the invention provide an apparatus and/or methodology for beneficially improving an estimation of offset between respective read signals obtained from multiple readers in a multi-reader TDMR environment. Moreover, it will become apparent to those skilled in the art given the teachings herein that numerous modifications can be made to the illustrative embodiments shown that are within the scope of the claimed invention. That is, no limitations with respect to the embodiments shown and described herein are intended or should be inferred.

As a preliminary matter, for purposes of clarifying and describing embodiments of the invention, the following table provides a summary of certain acronyms and their corresponding definitions, as the terms are used herein:

Table of Acronym Definitions

| Acronym | Definition |
| --- | --- |
| TDMR | Two-dimensional magnetic recording |
| ITI | Inter-track interference |
| HDD | Hard disk drive |
| TFC | Thermal fly-height control |
| TMR | Track mis-registration |
| FIR | Finite impulse response |
| IIR | Infinite impulse response |
| ADC | Analog-to-digital converter |
| FDF | Fractional delay filter (or filtering) |
| VCM | Voice coil motor |
| CPU | Central processing unit |
| SSD | Solid-state drive |
| RAM | Random access memory |
| AFE | Analog front end |
| ROM | Read-only memory |

As previously stated, one disadvantage of using a multi-reader approach is that there is an inherent offset (i.e., delay) between respective signals obtained from the readers due, at least in part, to a physical down-track (i.e., in a direction parallel to the tracks on the magnetic storage medium) distance separating the readers. Although manufacturers may provide the physical distances between the multiple readers, actual offset between the respective signals obtained from readers, referred to herein as "reader offset," can vary based on several factors. Such factors which may affect reader offset include, but are not limited to, environmental factors, such as, for example, temperature and mechanical vibration, as well as manufacturing factors, such as, for example, skew between the slider and the disk surface, and alignment of the readers relative to one another and/or to the slider, among other factors.

For example, some hard disk drives (HDDs) utilize a read head which incorporates a heater element therein, referred to as thermal fly-height control (TFC), to control fly-height. This temperature variation can physically cause the reader offset to change. Fly-height variation, which may be attributable to manufacturing variations in the disk surface (e.g., warped disk), can similarly affect reader offset. Physical damage, such as, for example, head touchdown, can cause a change in shape of one or more readers which can also affect reader offset. Differences in the respective sizes of the readers relative to one another (e.g., narrow and wide reader combination), misalignment between the readers (e.g., unparalleled readers), or misalignment between the readers and the slider arm, can affect reader offset. Furthermore, reader offsets are not necessarily constant. For instance, reader offset can be pre-computed for each zone of a disk, which varies for inner tracks compared to outer tracks of a given zone, or for each track, which can still vary due to non-zero track mis-registration (TMR). Consequently, accurately estimating reader offset can be quite challenging. Embodiments of the invention, therefore, advantageously estimate actual reader offset based on readback signal processing in real-time, to thereby improve read performance in a multi-reader TDMR system.

Figure 1B:
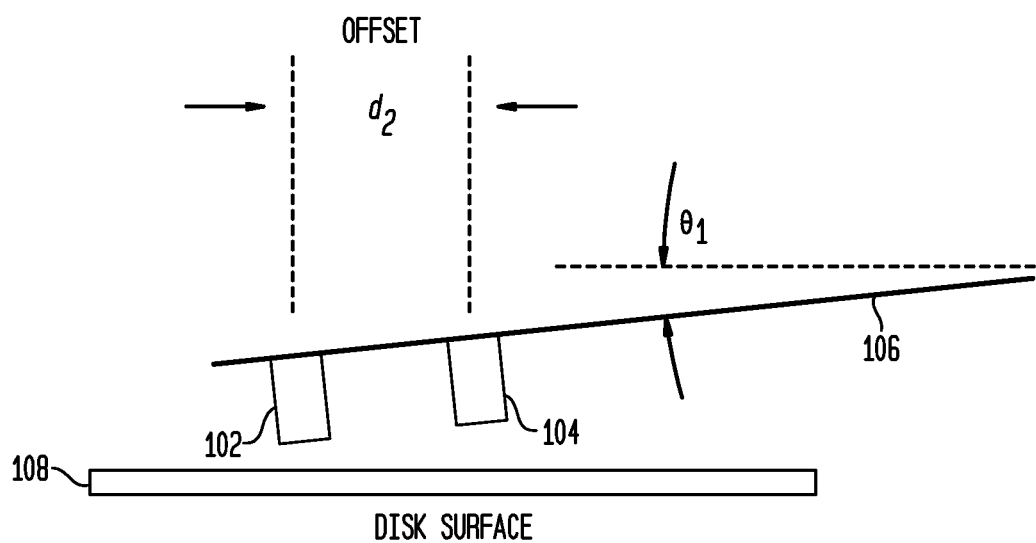

FIGS. 1A and 1B are side views of at least a portion of an illustrative multi-reader TDMR system 100 conceptually depicting an effect of read head fly-height variation on reader offset estimation. With reference to FIG. 1A, the system 100 includes a first reader 102 and a second reader 104 mounted on a slider 106. The first and second readers 102 and 104, respectively, are laterally separated from one another on the slider 106 by a first distance $d_1$. It is to be appreciated that although only two readers 102, 104 are shown, embodiments of the invention are not limited to the number of readers. Moreover, embodiments of the invention are not limited to any specific distances separating the respective readers. Since the slider 106, in this embodiment, is disposed parallel to an upper surface 108 of a magnetic disk to be read, an angle between the slider and the disk surface will be zero. Accordingly, the actual reader offset will be substantially equal to an estimated reader offset based on the distance $d_1$ between the readers 102, 104.

As shown in FIG. 1B, physical vibration, as well as other factors, can cause the slider 106 to be tilted relative to the disk surface 108. As apparent from FIG. 1B, an angle between the slider 106 and the disk surface 108 is equal to a first angle $\theta_1$, although embodiments of the invention are not limited to any specific value for angle $\theta_1$. This angle $\theta_1$ will result in a difference between the actual reader offset and the estimated reader offset based on the distance between the readers. More particularly, the actual reader offset will be based on a second distance, $d_2$, which can be determined as a function of the physical distance $d_1$ between the readers 102 and 104 on the slider 106 (e.g., $d_2 = d_1 \cdot \cos \theta_1$). Thus, for example, the actual reader offset will be approximately $d_1 \theta \cos \theta_1$ times the estimated reader offset shown in FIG. 1A.

Figure 2A:
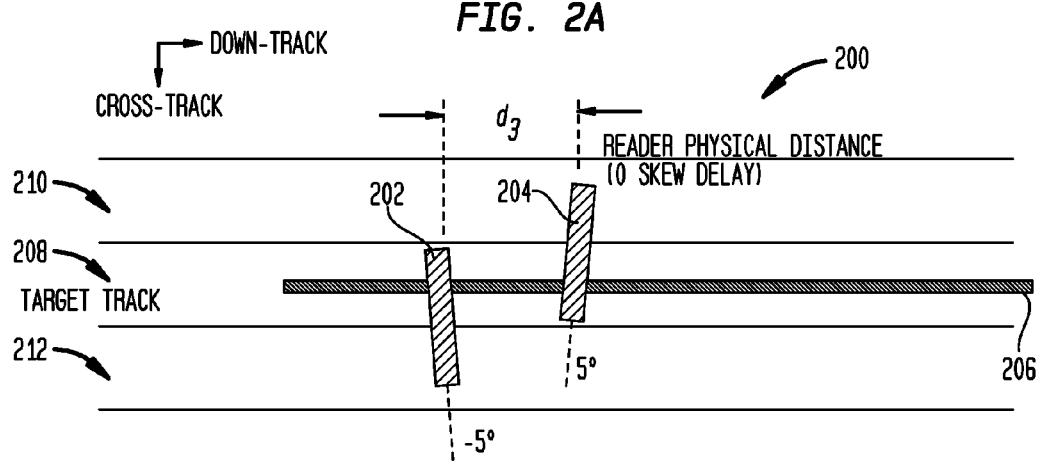
FIGS. 2A through 2C are top plan views of at least a portion of an illustrative multi-reader TDMR system conceptually depicting an effect of unparalleled readers on offset estimation.
Figure 2B:
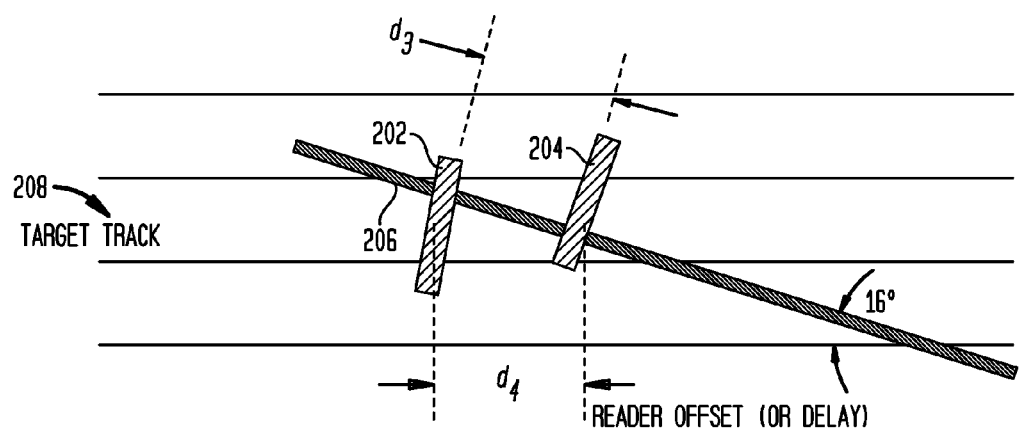
Figure 2C:
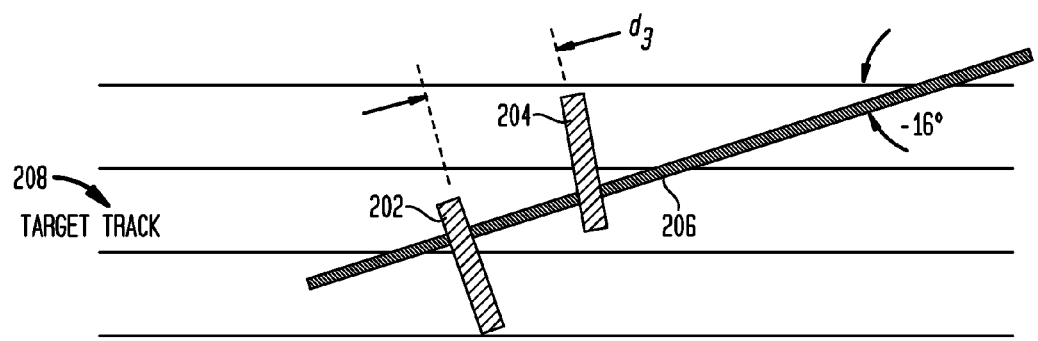

FIGS. 2A through 2C are top plan views of at least a portion of an illustrative multi-reader TDMR system 200 conceptually depicting an effect of unparalleled readers on reader offset estimation. With reference to FIG. 2A, the system 200 includes a first reader 202 and a second reader 204 mounted on a slider 206. The first and second readers 202, 204 are positioned above a target track 208 to be read and first and second tracks, 210 and 212, respectively, adjacent to the target track on a magnetic disk. The first and second readers 202 and 204, respectively, are laterally separated from one another on the slider 206 by a distance $d_3$. It is to be appreciated that although only two readers 202 and 204 are shown, embodiments of the invention are not limited to any specific number of readers; for example, three or more reads may be used, according to embodiments of the invention. Moreover, embodiments of the invention are not limited to any specific distances separating the respective readers.

In the illustrative scenarios shown in FIGS. 2A through 2C, the readers 202 and 204 are not parallel relative to one another. Rather, the first reader 202 is tilted at an angle of −5 degrees from an imaginary line perpendicular to the tracks 208, 210, 212. Likewise, the second reader 204 is tilted at an angle of 5 degrees from the imaginary line perpendicular to the tracks 208, 210, 212. It is to be understood that embodiments of the invention are not limited to any specific respective tilt angles of the first and second readers 202, 204. Since the readers 202, 204 are not tilted in the same direction, they are not parallel to one another. Consequently, although the tilt angle between the slider 206 and the tracks 208, 210, 212 is zero in FIG. 2A, the actual reader offset will not necessarily be based merely on the physical distance $d_3$ between the readers 202, 204, but rather will also be a function of the angle between the readers.

For the scenario shown in FIG. 2B, in addition to the readers 202 and 204 not being parallel relative to one another, the slider 206 is positioned at an angle of 16 degrees relative to the orientation of the target track 208. This angle will result in a difference between the actual reader offset and the estimated reader offset based on the distance $d_3$ between the readers 202, 204. More particularly, the actual reader offset will be based on a distance, $d_4$, which can be determined as a function of the physical distance $d_3$ between the readers 202 and 204 on the slider 206, the angle (16 degrees, in this embodiment) between the slider and the target track 208 orientation, and the angle between the readers.

Likewise, in the scenario shown in FIG. 2C, in addition to the readers 202 and 204 being tilted relative to one another, the slider 206 is positioned at an angle of −16 degrees relative to the orientation of the target track 208. Hence, the actual reader offset will be determined as a function of the physical distance $d_3$ between the readers 202 and 204 on the slider 206, the angle (−16 degrees, in this embodiment) between the slider and the target track 208 orientation, and the angle between the readers.

FIGS. 3A through 3C are top plan views of at least a portion of an illustrative multi-reader TDMR system 300 conceptually depicting an effect of a combination of wide and narrow readers on reader offset estimation. With reference to FIG. 3A, the system 300 includes a first reader 302 and a second reader 304 mounted on a slider 306. The first and second readers 302, 304 are positioned above a target track 308 to be read and first and second tracks, 310 and 312, respectively, adjacent to the target track on a magnetic disk. The first and second readers 302 and 304, respectively, are laterally separated from one another on the slider 306 by a distance $d_5$. It is to be appreciated that although only two readers 302 and 304 are shown, embodiments of the invention are not limited to any specific number of readers. Moreover, embodiments of the invention are not limited to any specific distances separating the respective readers.

In the illustrative scenarios shown in FIGS. 3A through 3C, the readers 302 and 304 are not equally sized. Rather, the first reader 302 has a width, as measured in a direction perpendicular to a center line of the slider 308, which is less than a width of the second reader 304. It is to be understood that embodiments of the invention are not limited to any specific respective dimensions of the first and second readers 302, 304. Consequently, although a skew between the slider 306 and the tracks 308, 310, 312 is zero in FIG. 3A, the actual reader offset will not necessarily be based merely on the physical distance $d_5$ between the readers 302, 304, but rather will also be a function of a difference in widths of the respective readers.

For the scenario shown in FIG. 3B, in addition to the difference in respective widths of the readers 302 and 304, the slider 306 is skewed at an angle, $\theta_2$, of 16 degrees relative to the orientation of the target track 308. This skew will result in a difference between the actual reader offset and the estimated reader offset based on the distance $d_5$ between the readers 302, 304. More particularly, the actual reader offset will be based on a distance, $d_6$, which can be determined as a function of the physical distance $d_5$ between the readers 302 and 304 on the slider 306, the skew angle $\theta_2$ (16 degrees, in this embodiment) between the slider and the target track 308 orientation, and the difference in widths of the readers.

Likewise, in the scenario shown in FIG. 3C, in addition to the difference between the widths of the respective readers 302 and 304, the slider 306 is skewed at an angle $\theta_2$ of −16 degrees relative to the orientation of the target track 308. Hence, the actual reader offset will be determined as a function of the physical distance $d_5$ between the readers 302 and 304 on the slider 306, the skew angle $\theta_2$ (−16 degrees, in this embodiment) between the slider and the target track 308 orientation, and the difference in widths of the readers.

Figure 4A:
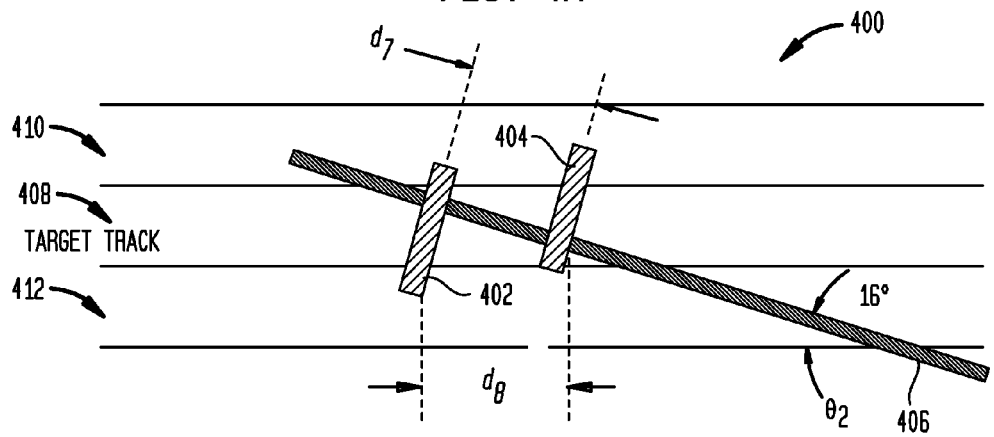
FIGS. 4A through 4C are top plan views depicting at least a portion of an exemplary multi-reader TDMR system conceptually illustrating reader track configurations for three exemplary scenarios, comprising three different skew angles and readers with a prescribed cross-track separation between them at zero skew, according to embodiments of the invention.
Figure 4B:
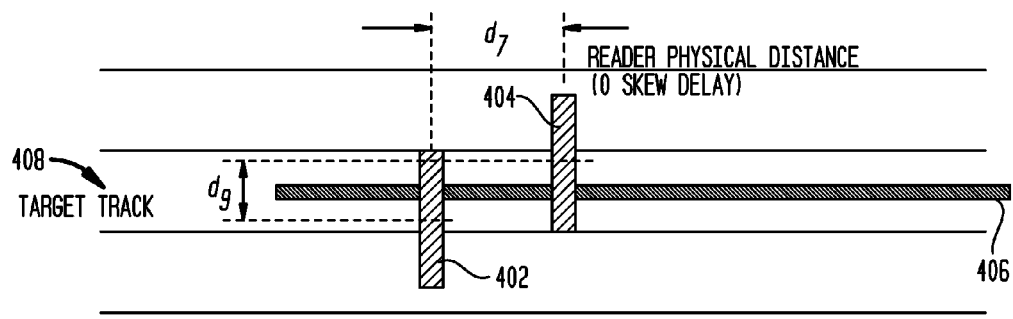
Figure 4C:
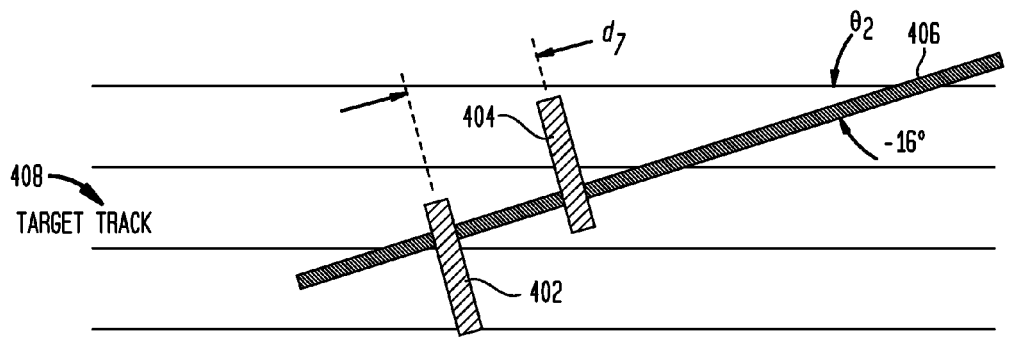

FIGS. 4A through 4C are top plan views depicting at least a portion of an exemplary multi-reader TDMR system 400 conceptually illustrating reader track configurations for three exemplary scenarios, according to embodiments of the invention. With reference to FIG. 4A, the system 400 includes a first reader 402 and a second reader 404 mounted on a slider 406. The first and second readers 402, 404 are suspended above a recording medium (e.g., magnetic disk) by a head arm (not explicitly shown, but implied) attached to the slider 406. The first and second readers 402 and 404, respectively, are positioned above a target track 408 to be read, and first and second tracks, 410 and 412, respectively, adjacent to the target track on the magnetic disk. The readers 402, 404 are laterally separated from one another on the slider 406 by a distance $d_7$; the distance $d_7$ defines the down-track distance between the two readers 402, 404 at zero skew. It is to be appreciated that although only two readers 402 and 404 are shown, embodiments of the invention are not limited to any specific number of readers. Moreover, embodiments of the invention are not limited to any specific distances separating the respective readers.

By way of example only and without limitation, FIGS. 4A through 4C depict three different skew scenarios of the multi-reader TDMR system 400. Specifically, FIG. 4A depicts a first illustrative scenario in which the slider 406 is skewed relative to an orientation of the target track 408 by an angle, $\theta_2$, of 16 degrees, FIG. 4B depicts a second illustrative scenario in which the slider is skewed relative to an orientation of the target track by an angle $\theta_2$ of zero degrees (i.e., zero skew), and FIG. 4C depicts a third illustrative scenario in which the slider is skewed relative to an orientation of the target track by an angle $\theta_2$ of −16 degrees, although embodiments of the invention are not limited to any specific skew. A non-zero skew will result in a difference between the actual reader offset and the estimated reader offset based on the physical distance between the readers, which takes into account the down-track distance $d_7$ and a cross-track separation, $d_9$, between the readers, both distances based on a center of the readers. With reference to FIG. 4B, $d_9$ represents the cross-track separation between the readers 402, 404 at zero skew.

More particularly, for the zero-skew scenario shown in FIG. 4B, the actual reader offset will be approximately the same as the estimated reader offset based on the manufacturer-provided distance between readers 402, 404. With reference to FIGS. 4A and 4C, the actual reader offset will be based on a distance, $d_8$, which can be determined as a function of the physical distance $d_7$ between the readers 402 and 404 on the slider 406, the skew angle between the slider and the target track, and the cross-track separation: $d_8 = d_7 \cos \theta_2 + d_9 \sin \theta_2$, where $\theta_2$ is indicative of skew angle. Hence, distance $d_8$ represents down-track distance between the readers 402, 404 at skew. Since the skew angle $\theta_2$ is an acute angle (e.g., typically about −16 degrees to 20 degrees, although not limited to such range), the actual reader offset for a non-zero skew angle case will be larger than the distance between the readers. In TDMR signal processing, since the actual reader offset (i.e., delay) is required for proper data alignment, embodiments of the invention beneficially achieve enhanced reader offset estimation using readback signal processing in real-time to thereby improve read performance in a multi-reader TDMR system.

In a multi-reader TDMR system, multiple readers are used to read sectors on adjacent tracks on a magnetic disk. However, as previously explained, because the readers are physically separated in a down-track direction from one another, a delay (i.e., offset) will exist between the signals obtained from corresponding readers. For the two-reader configuration shown in FIGS. 4A through 4C, readback signals, $r_1(n)$ and $r_2(n)$, received from the first and second readers 402 and 404, respectively, are modeled using the following expressions:

$$r_1(n) = \mu_1 s_0(n) + \alpha_{1,1} s_1(n) + \beta_{1,2} s_2(n) \quad (1)$$

$$r_2(n) = \mu_2 s_0(n-\Delta) + \alpha_{2,1} s_1(n-\Delta) + \beta_{2,2} s_2(n-\Delta), \quad (2)$$

where $\mu_1$ is a weighting coefficient indicative of a contribution from the target track 408 in the readback signal from the first reader (i.e., reader 1), $\alpha_{1,1}$ is a weighting coefficient indicative of a contribution from the adjacent track 410 in the readback signal from the first reader, and $\beta_{1,2}$ is a gain coefficient indicative of a contribution from the adjacent track 412 in the readback signal from the first reader. Likewise, $\mu_2$ is a weighting coefficient indicative of a contribution from the target track 408 in the readback signal from the second reader (i.e., reader 2), $\Delta$ is the delay offset between the two readers, $\alpha_{2,1}$ is a weighting coefficient indicative of a contribution from the adjacent track 410 in the readback signal from the second reader, and $\beta_{2,2}$ is a gain coefficient indicative of a contribution from the adjacent track 412 in the readback signal from the second reader. Correspondingly, $s_0(n)$, $s_1(n)$ and $s_2(n)$ denote the readback signals from the data recorded on target track 408, adjacent track 410 and adjacent track 412, respectively. It is to be understood that the delay offset $\Delta$ between the two readers need not be an integer multiple of a sampling period, T. Data recorded in adjacent tracks are independent.

In accordance with one or more embodiments of the invention, a methodology for increasing an accuracy of reader offset estimation in a multi-reader TDMR system comprises a two-step process; namely, correlation and fractional delay filtering. As will be described in further detail below, correlation essentially involves obtaining a rough estimation of the reader offset (i.e., delay) having a resolution T, where T denotes the sampling period (i.e., bit duration). Fractional delay filtering involves refining the estimation result from the correlation step.

By way of example only, for the exemplary two-reader configuration shown in FIGS. 4A through 4C, correlation between the readback signals $r_1(n)$ and $r_2(n)$, received from the first and second readers 402 and 404, respectively, can be expressed using the following notation:

$$r_1(n) * r_2(n) = 1 \dagger (A \circ C) 1, \quad (3)$$

where "*" represents a correlation of the first and second readback signals $r_1(n)$ and $r_2(n)$, respectively, "A" represents a correlation matrix, "C" represents a weighting coefficient matrix, "1" represents an all-one column vector, "†" denotes a matrix transpose, and "∘" represents a Hadamard product of matrices A and C. A Hadamard product, also known as a Schur product or entrywise product, is a binary operation that takes two matrices of the same dimensions and produces another matrix where each element, ij, is a product of elements ij of the original two matrices. The correlation matrix A and weighting coefficient matrix C in equation (3) above can be expressed as:

$$A = \begin{bmatrix} s_0(n) * s_0(n-\Delta) & s_0(n) * s_1(n-\Delta) & s_0(n) * s_2(n-\Delta) \\ s_1(n) * s_0(n-\Delta) & s_1(n) * s_1(n-\Delta) & s_1(n) * s_2(n-\Delta) \\ s_2(n) * s_0(n-\Delta) & s_2(n) * s_1(n-\Delta) & s_2(n) * s_2(n-\Delta) \end{bmatrix} \quad (4)$$

$$C = \begin{bmatrix} \mu_1 \mu_2 & \mu_1 \alpha_{2,1} & \mu_1 \beta_{2,2} \\ \alpha_{1,1} \mu_2 & \alpha_{1,1} \alpha_{2,1} & \alpha_{1,1} \beta_{2,2} \\ \beta_{1,2} \mu_2 & \beta_{1,2} \alpha_{2,1} & \beta_{1,2} \beta_{2,2} \end{bmatrix} \quad (5)$$

Diagonal elements of the correlation matrix A are auto-correlation functions, and off-diagonal elements of matrix A are cross-correlation functions. An element of the weighting coefficient matrix C determines the energy of a certain auto- or cross-correlation pair in the final results.

The auto-correlations of the readback signals $r_1(n)$ and $r_2(n)$ from the two readers are dominated by two components: the correlation matrix A and the weighting coefficient matrix C. The correlation matrix A is responsible for the recorded data in target and adjacent tracks, and the weighting coefficient matrix C is responsible for the gain, which is determined at least in part by the relative geometries of the readers and/or tracks.

Off-diagonal (i.e., cross-correlation functions in the correlation matrix A) are suppressed in the final results, according to embodiments of the invention. One way to suppress off-diagonal contributions in the final results, according to an embodiment of the invention, is to suppress the cross-correlation elements of the correlation matrix A (expression (4) above). In the user data area, the recorded data is random and mutually independent across different tracks. Consequently, long readback signal length can guarantee better reader offset estimation performance. Another way to suppress off-diagonal contributions in the final results, according to an embodiment of the invention, is to suppress the off-diagonal elements of the weighting coefficient matrix C by controlling relative head-track geometry. The weighting coefficients are dependent on the relative geometries of the head and tracks. For example, if the first reader is very close to track 0, the corresponding weighting coefficient would be large. Gain control, as used herein, refers to changing the relative location of reader and tracks to thereby change the gain.

For the exemplary head-track configurations shown in FIG. 4A, the following assumptions are made:

$$|\mu_1| \gg |\alpha_{1,1}| \; |\mu_1| \gg |\beta_{1,2}| \; |\mu_2| \gg |\alpha_{2,1}| \; |\mu_2| \gg |\beta_{2,2}|$$

Given the above assumptions, it can be shown that element $\mu_1 \mu_2$ in the weighting coefficient matrix C of expression (5)

above is substantially larger than the other elements in matrix C. Accordingly, the contribution $s_0(n)*s_0(n-\Delta)$ in the correlation matrix A dominates the final results. Using this approximation, the correlation can achieve a good estimation result with a reasonable length of readback signals. More particularly, a performance of the correlation-based estimator according to one or more embodiments of the invention is dependent on an orthogonality of the two adjacent track readback signals. Even though the data recorded in adjacent tracks are pseudo-random, the orthogonality can only be guaranteed if the readback signals from the adjacent tracks are long enough or of reasonable length.

For the exemplary head-track configuration shown in FIG. 4B, which is a zero-skew case, the following assumptions are made:

$$|\beta_{1,1}|>|\mu_1|>>|\alpha_{1,2}|\approx 0 \quad |\alpha_{2,2}|>|\mu_2|>>|\beta_{2,1}|\approx 0$$

Given the above assumptions, elements $\mu_1\beta_{2,1}$, $\beta_{1,1}\beta_{2,1}$, $\alpha_{1,2}\mu_2$, $\alpha_{1,2}\beta_{2,1}$, and $\alpha_{1,2}\alpha_{2,2}$ in the weighting coefficient matrix C of expression (5) above will be nearly zero, and elements $\mu_1\mu_2$, $\mu_1\alpha_{2,2}$, $\beta_{1,1}\mu_2$, and $\beta_{1,1}\alpha_{2,2}$ are significant elements in matrix C. As used herein, a "significant" term means that the value of that term is large and dominates the final results. The matrix C has three off-diagonal elements corresponding to cross-correlation of interferences. Accordingly, long readback signals can be used to suppress these off-diagonal elements of matrix A. As previously explained, long readback signals can guarantee the orthogonality of the adjacent tracks, and thus, as a close approximation, interference terms can be removed from the final results.

A second step in a methodology for increasing the accuracy of reader offset estimation in a multi-reader TDMR system involves fractional delay filtering. As previously stated, fractional delay filtering is used to refine the estimation result from the correlation step. A resolution of the correlation-based step is sampling period T. This resolution is refined, in accordance with one or more embodiments of the invention, through signal processing technology.

In fractional delay filtering, a phase input signal is supplied to a fractional delay filter. For example, phase values can be $[-8, -7, -6, -5, -4, -3, -2, -1, 0, 1, 2, 3, 4, 5, 6, 7, 8]\cdot T/16$, where T denotes a sampling offset (i.e., bit duration), as noted above, and zero phase indicates no delay. A fractional delay filter is a type of digital filter designed for band-limited interpolation, which involves evaluating a signal sample at an arbitrary point in time, which may be somewhere between two sample points. Fractional delay filters can be implemented, in one or more embodiments, using finite impulse response (FIR) or infinite impulse response (IIR) filters, although embodiments of the invention are not limited to such implementations. The interpolated result generated by the fractional delay filter is then used, according to one or more embodiments of the invention, to refine the reader offset (i.e., delay) estimation.

In one or more embodiments of a practical system implementation, the fractional delay filter is placed prior to a correlation estimator in a reader signal path. In digital signal processing, a signal sampled with period T can only obtain samples s(1T), s(2T), s(3T), and so on. This means that a resolution of the resulting digital signal in the time domain is T. However, in certain scenarios, sample values at arbitrary points in time are desired, such as, for example, s(1.3T), s(2.3T), etc., which are not otherwise available as an output from the analog-to-digital converter (ADC). In this regard, the fractional delay filter functions as an interpolator. Thus, by way of example only and without limitation, assuming a phase-correction amount is set as 0.3T, an output of the fractional delay filter would be s(1.3), if the input signals are s(1T) and s(2T). This process can be extended to obtain a signal value at essentially any arbitrary point in time.

Figure 5:
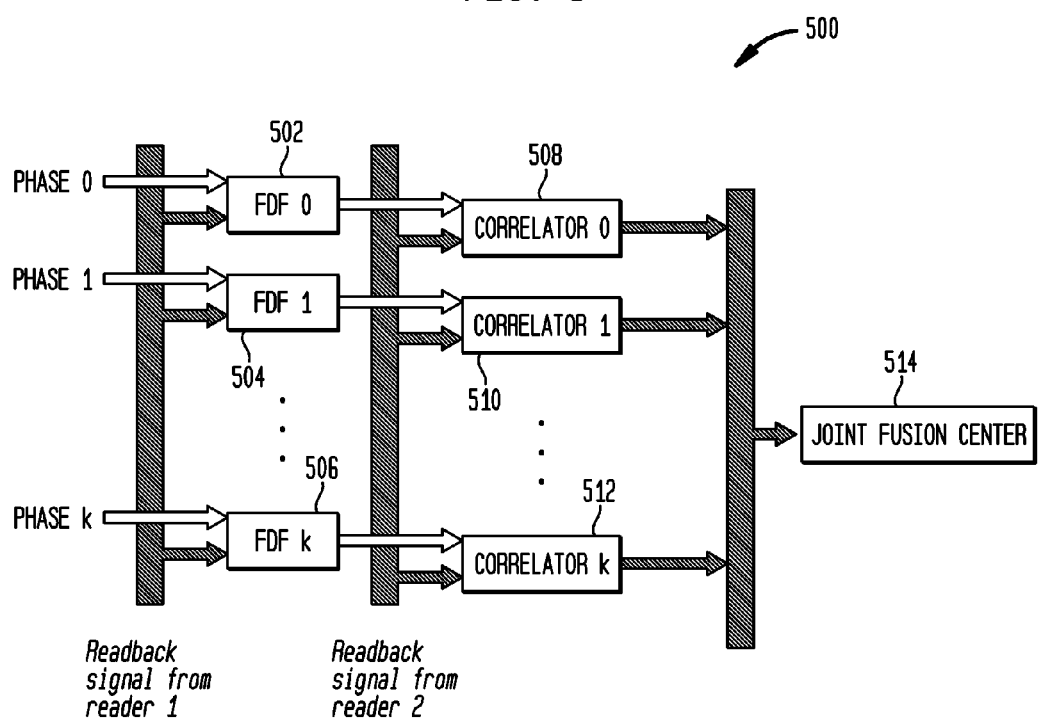
FIG. 5 is a block diagram depicting at least a portion of an exemplary system including a parallel implementation of a correlation and fractional delay filtering methodology for increasing reader offset estimation accuracy, according to an embodiment of the invention.

FIG. 5 is a block diagram depicting at least a portion of an exemplary system 500 including a parallel implementation of the correlation and fractional delay filtering methodology for increasing reader offset estimation accuracy, according to an embodiment of the invention. System 500 includes multiple (k+1) interpolation filters (e.g., fractional delay filter, polynomial-based filter, etc.), used to interpolate new sample values at arbitrary points between existing discrete-time samples, and multiple (k+1) correlators coupled with the interpolation filters. Specifically, in this illustrative embodiment, the system 500 includes a first fractional delay filter (FDF 0) 502, a second fractional delay filter (FDF 1) 504, and a (k+1)-th fractional delay filter (FDF k) 506, where k is an integer. The system 500 further includes a first correlator 508, a second correlator 510 and a (k+1)-th correlator 512.

Each of the fractional delay filters 502, 504 and 506 is adapted to receive, at a first input, a corresponding value of the phase to which the signal from reader 1 should be interpolated, Phase 0, Phase 1 and Phase k, respectively, and a second input of each of the fractional delay filters is adapted to receive a readback signal from a first reader (reader 1); the readback signal from the first reader is a common input to all of the fractional delay filters. Each of the fractional delay filters 502, 504 and 506 is operative to generate a corresponding interpolated signal as a function of the readback signal from the first reader and a corresponding phase input.

Each of the interpolated signals generated by the fractional delay filters 502, 504 and 506 are supplied to a first input of a corresponding correlator 508, 510 and 512, respectively, and a second input of each of the correlators is adapted to receive a readback signal from a second reader (reader 2); the readback signal from the second reader is a common input to all of the correlators. From the output of each of the correlators 508, 510 and 512, the location and value of the peak value of the correlator output is collected and supplied to a joint fusion center 514 where they are used in refining the reader offset estimation result. The joint fusion center 514 is operative to select a signal path having the largest correlation peak value among the plurality of phase input samples. It is to be understood that the fractional delay filters 502, 504, 506 are operative to determine a fractional delay portion of the reader offset estimation. By adding the fractional delay portion to the integer delay portion generated by the ADCs, the joint fusion center 514 will determine a total delay for the reader offset. For example, if the peak value corresponding to the phase correction 0.3T is the largest, then the estimated fractional delay would be 0.3T; this fractional delay is added to the integer delay in enhancing an accuracy of the resulting reader offset estimation. The joint fusion center 514, according to embodiments of the invention, is implemented in hardware, software, or a combination of hardware and software, as will become apparent to those skilled in the art.

The parallel implementation of the correlation and fractional delay filtering methodology for increasing reader offset estimation accuracy shown in FIG. 5 is able to achieve fast computation speed at the expense of increased hardware complexity. Where speed is not as critical, however, reduced hardware complexity can be achieved using a sequential implementation of the correlation and fractional delay filtering methodology, in accordance with one or more alternative embodiments.

Figure 6:
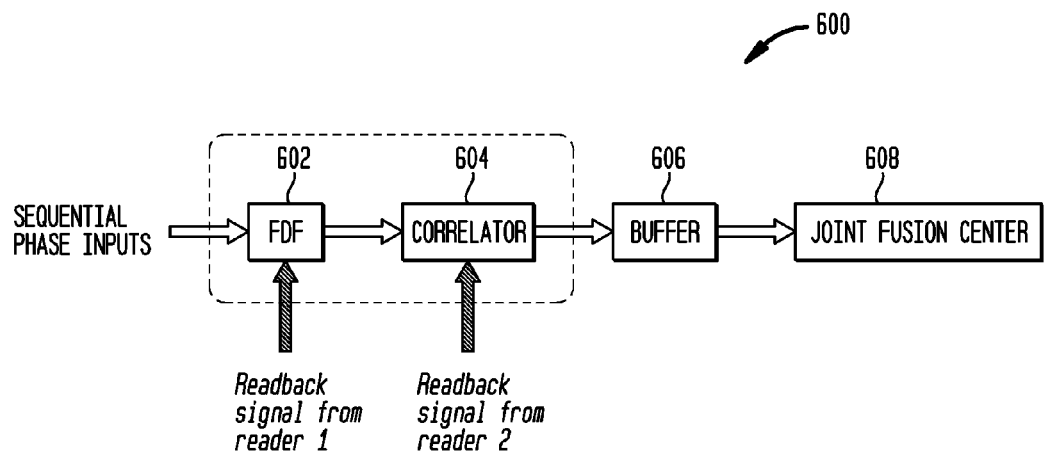
FIG. 6 is a block diagram depicting at least a portion of an exemplary system including a sequential implementation of the correlation and fractional delay filtering methodology for increasing reader offset estimation accuracy, according to an embodiment of the invention.

FIG. 6 is a block diagram depicting at least a portion of an exemplary system 600 including a sequential implementation of the fractional delay filtering and correlation methodology for increasing reader offset estimation accuracy, according to an embodiment of the invention. Compared to the parallel implementation 500 shown in FIG. 5 which includes a plurality of fractional delay filters and a plurality of correlators, the sequential implementation 600 depicted in FIG. 6 includes a single fractional delay filter 602 and a single correlator 604, and thus system complexity is significantly reduced while response time is increased. The fractional delay filter 602 is adapted to receive sequential phase inputs and a readback signal from a first reader (reader 1), and is operative to generate an interpolated signal which is supplied to the correlator 604. The correlator 604 is adapted to receive the interpolated signal at a first input and a readback signal from a second reader (reader 2) at a second input, and the location and value of the peak value of the correlator output is collected and passed to a buffer 606. Here, the output signal generated by the correlator 604 is a correlation of the signal $r_2(nT)$ from reader 2 with a different delay version of the signal $r_1(nT+pT)$ from reader 1, where n is an integer and p is a fraction.

In this embodiment, the interpolation and correlation functions, performed by the fractional delay filter 602 and the correlator 604, respectively, within the dotted boundary shown in FIG. 6, are executed iteratively for k times, where k denotes the total number of sequential phase inputs received by the fractional delay filter. Buffer 606, or an alternative storage means, is coupled with an output of the correlator 604 and is operative to store the k pairs of peak locations and peak values iteratively generated by the correlator. The buffer 606 is configured having a depth of at least k storage locations; one storage location for each of the respective k pairs of outputs from the correlator. In this manner, the buffer 606 functions essentially as a serial-to-parallel converter. The outputs stored in the buffer 606 are supplied to a joint fusion center 608, which utilizes these outputs for increasing the accuracy of the reader offset estimation. In this embodiment, the operation of the joint fusion center is consistent with the joint fusion center 514 shown in FIG. 5 and described herein above. More particularly, the joint fusion center 608, like the joint fusion center 514 in the embodiment of FIG. 5, is operative to select a signal path having the largest correlation peak value among the plurality of phase input samples. It is to be appreciated that, although depicted as a separate functional module, at least a portion of the buffer 606 may be implemented in the joint fusion center 608.

To compute the output of the fractional delay filter 602, values of the input signal between existing discrete-time samples are fractionally delayed by a fractional input phase. Special interpolation filters, as will be known by those skilled in the art, are used in accordance with embodiments of the invention to compute new sample values at arbitrary points in time. Among those interpolation filters, polynomial-based filters are particularly well-suited because a special structure, namely, a Farrow structure, permits simple handling of coefficients. Specifically, although not limited to any particular implementation, in one or more embodiments, the fractional delay filter 602 is implemented using a Farrow structure, wherein all filter coefficients are fixed while the input phase is adjusted to obtain prescribed interpolation results at different fractional delays. An advantage of using a Farrow structure over other realizations of the fractional delay filter 602 (e.g., direct-form FIR) resides in its tunability, which makes the Farrow structure well-suited for practical hardware implementations. In many practical applications, the delay is time-varying. Thus for each new delay, a new set of coefficients would be required using, for example, a direct-form approach; with a Farrow structure, the polynomial coefficients remain constant.

Figure 7:
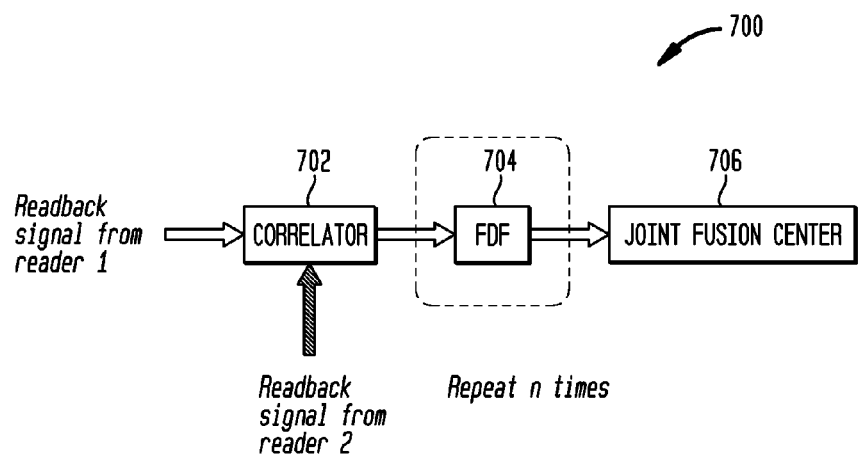
FIG. 7 is a block diagram depicting at least a portion of an exemplary system including a half-delay fractional delay filtering implementation and signal combining methodology for increasing reader offset estimation accuracy, according to an embodiment of the invention.

With reference now to FIG. 7, a block diagram depicts at least a portion of an exemplary system 700 including a half-delay fractional delay filtering implementation and signal combining methodology for increasing reader offset estimation accuracy, according to an embodiment of the invention. The system 700 includes a correlator 702 coupled with a fractional delay filter 704. The correlator 702 is adapted to receive, at a first input, a first readback signal from a first reader and, at a second input, a second readback signal from a second reader. An output signal generated by the correlator 702 is supplied to the fractional delay filter 704 which is operative to iteratively perform fractional delay filtering n times, where n is an integer and $T/2^n$ represents a resolution of the offset reader estimation result.

Figure 9:
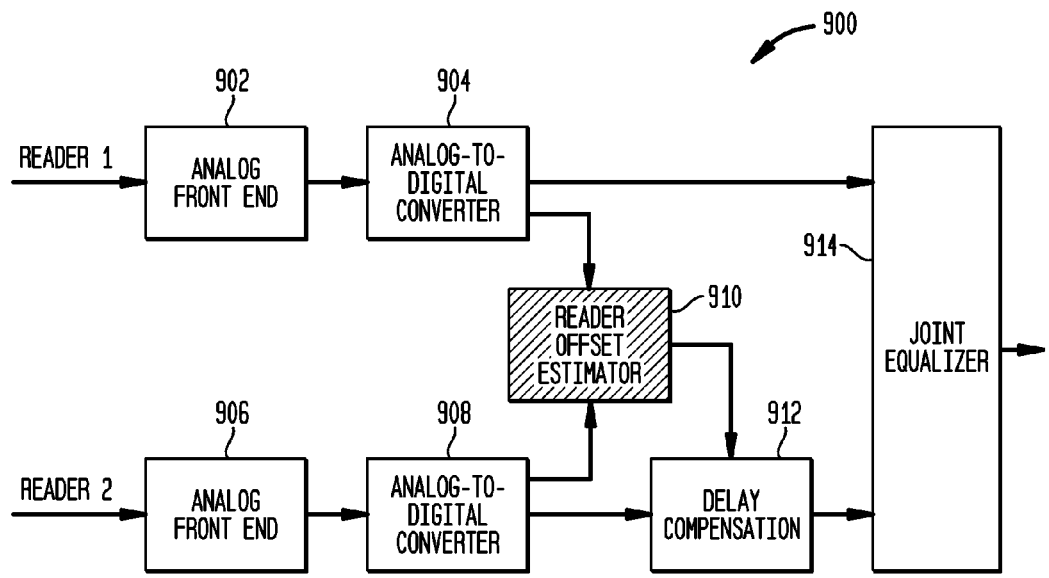
FIG. 9 is a block diagram depicting at least a portion of an exemplary read channel in which one or more embodiments of the invention are employed that is suitable for use in a TDMR system, according to an embodiment of the invention.

In accordance with one or more embodiments of the invention, a phase for the fractional delay filter 704 is fixed at 0.5T, where T denotes the sampling period for the ADC (ADCs 904 or 908 in FIG. 9). By way of example only and without limitation, assume a first digital signal, v0, generated as an output of the correlator 702 is passed through the fractional delay filter 704 during a first iteration, a second signal, v1, which is a delayed version of the first signal v0 is generated having a delay of 0.5T compared to signal v0. Combining signals v0 and v1 according to their respective sampling times, a third signal, v2, is obtained having a resolution 0.5T. Similarly, signal v2 is passed through the fractional delay filter 704 during a second iteration, and a fourth signal, v3, is generated having a delay 0.5·(0.5T). Combining signals v2 and v3, a fifth signal, v4, is obtained having a resolution 0.25T. Extending this process iteratively n times, a resolution of the resulting signal can be improved by $T/2^n$. A joint fusion center 706 coupled with an output of the fractional delay filter 704 is operative to select a peak of the interpolated correlation result to thereby obtain an estimate of reader offset delay, according to one or more embodiments of the invention. A resolution of the estimation is $T/2^n$.

Figure 8:
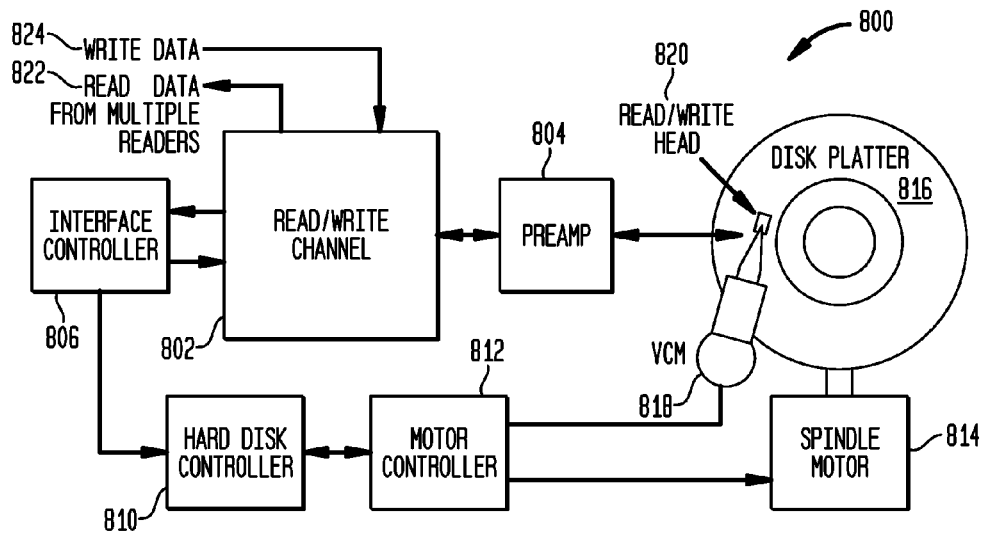
FIG. 8 is a block diagram depicting at least a portion of a magnetic disk drive storage system in which one or more embodiments of the invention are employed.

FIG. 8 is a block diagram depicting at least a portion of a magnetic disk drive storage system 800 in which one or more embodiments of the invention are employed. The system 800 includes a read/write channel 802 comprising a TDMR read channel configured for use with multiple readers, a preamplifier (preamp) 804 coupled with the read/write channel, an interface controller 806 coupled with the read/write channel, a hard disk controller 810 coupled with the interface controller, a motor controller 812 coupled with the hard disk controller, and a spindle motor 814 coupled with and operative to rotate a disk platter 816 comprising a plurality of tracks, or an alternative magnetic storage medium. A voice coil motor (VCM) 818 attached to an actuator arm is configured to maintain a position of at least one read/write head 820 above a surface of the disk platter 816 as a function of one or more control signals generated by the motor controller 812. In a multi-reader configuration, the system 800 would include multiple read/write heads and corresponding preamplifiers coupled therewith. Thus, read/write head 820 is intended to collectively represent one or a plurality of read/write heads; likewise, preamplifier 804 is intended to collectively represent one or a plurality of preamplifiers coupled with corresponding read/write heads.

The read/write channel 802 is the fundamental mixed signal analog/digital module of the disk drive storage system 800 and, although shown as a single block, is actually comprised of two separate channels: a read channel and a write channel. The read channel is operative to extract, from the disk platter

816, a clock signal, equalize an input read signal (i.e., read pulse), make a determination regarding a digital state (e.g., logic "1" or "0") of the input read signal, and decode read data 822 as a function of the input read signal. The write channel is operative to encode write data 824 for storage on the disk platter 816 in the form of magnetic field orientations indicative of a logical state of the write data. The read/write channel 802 is assisted by the preamplifier 804, which is configured to drive the write head portion of the read/write head 820 during a write process and to amplify the input signal obtained from the read head portion of the read/write head during a read process.

The interface controller 806 is adapted to control a data interface between the read/write channel 802 and a central processing unit (CPU) or alternative controller, which may include handling interrupts and data transfer protocols common to magnetic drives or solid-state drives (SSDs). The interface controller 806 may optionally include an auxiliary buffer, which can be implemented, for example, using random access memory (RAM), for caching and queuing data, providing long data-bursts to improve speed and reduce bus latency. The hard disk controller 810 calculates actuator trajectories and controls the spindle motor 814 and VCM 818, via the motor controller 812, to correctly position and maintain the read/write head 820 on a prescribed track of the disk platter 816.

FIG. 9 is a block diagram depicting at least a portion of an exemplary read channel 900 in which one or more embodiments of the invention are employed that is suitable for use in a TDMR system (e.g., in the read channel module 802 shown in FIG. 8), according to an embodiment of the invention. The read channel 900, in this embodiment, is adapted for use in a two-reader TDMR architecture, although embodiments of the invention are not limited to use with two readers. The read channel 900 includes a first analog front end (AFE) 902 and a first ADC 904 coupled with an output of the first AFE. The first AFE 902 is operative to receive an input signal obtained from a first reader (which in this embodiment is a primary reader), either directly (in which case the first AFE includes a preamplifier or other amplification circuitry) or from a preamplifier (not explicitly shown, but implied) coupled between the first reader and the first AFE, and to generate a first analog read signal as an output thereof. The first AFE 902 may, in one or more embodiments, include signal processing circuitry (e.g., filters, etc.) for reducing noise or otherwise improving a quality of the first analog read signal. The first ADC 904 is operative to receive the first analog read signal and to generate, as a function of the first analog read signal, a first digital read signal. The first digital read signal is a digital version of the first analog read signal, sampled at prescribed discrete time intervals based on a sampling period of the first ADC.

Likewise, the read channel 900 includes a second AFE 906 and a second ADC 908 coupled with an output of the second AFE. The second AFE 906 is operative to receive an input signal obtained from a second reader (which in this embodiment is a secondary reader), either directly (in which case the second AFE includes a preamplifier or other amplification circuitry) or from a preamplifier (not explicitly shown, but implied) coupled between the second reader and the second AFE, and to generate a second analog read signal as an output thereof. The second AFE 906 may, in one or more embodiments, include signal processing circuitry (e.g., filters, etc.) for reducing noise or otherwise improving a quality of the second analog read signal. The second ADC 908 is operative to receive the second analog read signal and to generate, as a function of the second analog read signal, a second digital read signal. The second digital read signal is a digital version of the second analog read signal, sampled at prescribed discrete time intervals based on a sampling period of the second ADC.

Each of the first and second digital read signals generated by the first and second ADCs 904 and 908, respectively, are supplied to a reader offset estimator module 910 operative to generate, as an output thereof, an enhanced reader offset estimation signal having increased accuracy. The reader offset estimator module 910, in one or more embodiments of the invention, is implemented using fractional delay filters and correlators. Illustrative implementations of reader offset estimator modules according to embodiments of the invention were previously described in conjunction with FIGS. 5 through 7. Each of the first and second digital read signals generated by the first and second ADCs 904 and 908, respectively, comprises an integer (i.e., discrete) component indicative of a value of the corresponding digital read signal at an integer multiple of the sampling period associated with the corresponding ADC. The fractional delay filters included in the reader offset estimator module 910 are adapted to determine, using interpolation or alternative means, a fractional component indicative of a value of the corresponding digital read signal at an arbitrary point in time between integer multiples of the corresponding sampling period (e.g., between adjacent discrete samples). From the respective outputs of the correlators (e.g., 508, 510 and 512 in FIG. 5), the location and value of the peak value of the correlator output is collected and used in refining the reader offset estimation result. By adding the fractional component to the integer (i.e., discrete) component generated by the ADCs 904 and 908, a total reader offset delay is determined.

The enhanced reader offset estimation signal generated by the reader offset estimator module 910 is supplied to a delay compensation module 912 which is coupled in a signal path of the second reader. Specifically, the delay compensation module 912 is coupled with an output of the second ADC 908 and is operative to receive the second digital read signal. The delay compensation module 912, which may be implemented, in one or more embodiments, using a programmable delay line or alternative means, is operative to generate a delayed version of the second digital read signal. The amount of delay added to the second digital read signal by the delay compensation module 912 is controlled as a function of the reader offset estimation signal generated by the reader offset estimator module 910.

The read channel 900 further includes a joint equalizer module 914 adapted to receive the first digital read signal generated by the first ADC 904 and the delayed version of the second digital read signal generated by the delay compensation module 912, and is operative to generate an output signal which is used to equalize input read signals (i.e., read pulses), make a determination regarding a digital state (e.g., logic "1" or "0") of the target track, and decode the read data as a function of the first and second input read signals. It is to be appreciated that although a single delay compensation module is shown coupled in the signal path of the second reader, embodiments of the invention are not limited to this arrangement. For example, in accordance with another embodiment, a second delay compensation module can be coupled in a signal path of the first reader for generating a delayed version of the first digital read signal. An amount of delay of the first digital read signal being controlled as a function of the output of the reader offset estimator module 910. In this manner, embodiments of the invention are used by the TDMR system for improving read performance.

As will be appreciated by those skilled in the art, embodiments of the present invention may be implemented, in whole or in part, as an apparatus, system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, embodiments of the present invention may take the form of a computer program product embodied in one or more non-transitory machine-readable medium(s) having machine-readable program code embodied thereon.

One or more embodiments of the invention, or elements thereof, can be implemented in the form of an apparatus including a memory and at least one processor coupled with the memory and operative to perform exemplary method steps.

Figure 10:
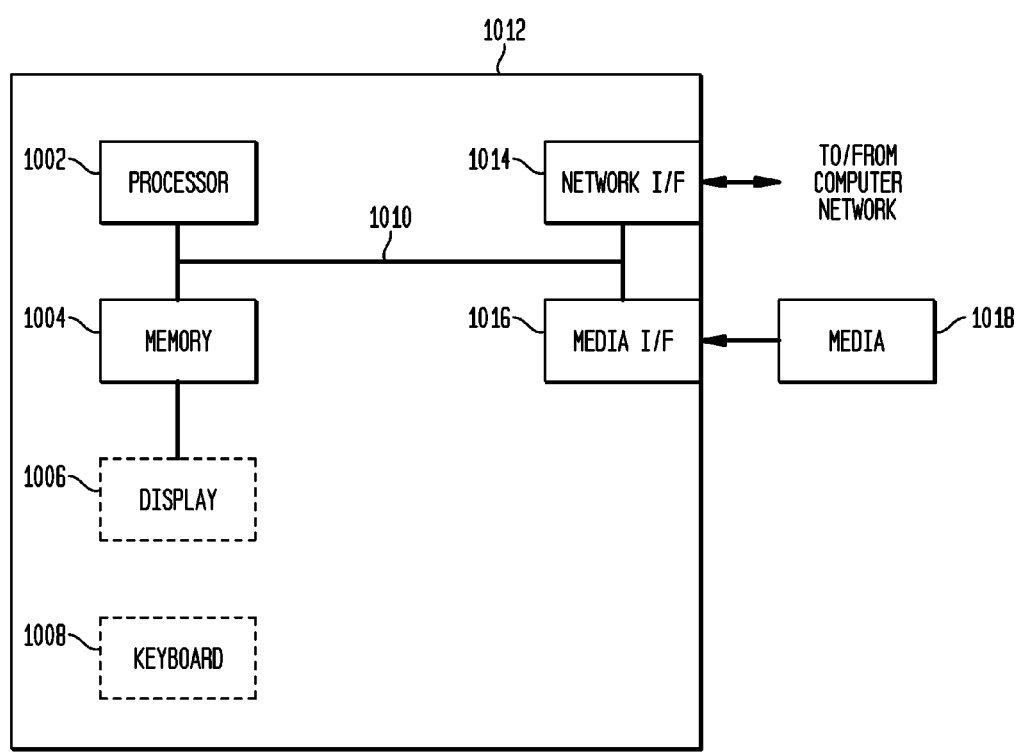
FIG. 10 depicts a computer system that may be useful in implementing one or more embodiments and/or elements of the invention.

One or more embodiments can make use of software running on a general purpose computer or workstation. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a CPU and/or other forms of processing circuitry. Further, the term "processor" may refer to more than one individual processor. The term "memory" is intended to include memory associated with a processor or CPU, such as, for example, RAM, ROM (read-only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing methodologies according to embodiments of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1002 coupled directly or indirectly with memory elements 1004 through a system bus 1010. The memory elements can include local memory employed during actual implementation of the program code, bulk storage, cache memories and embedded memory which provide temporary storage of at least a portion of program code in order to reduce the number of times the code must be retrieved from bulk storage during implementation.

Input/output or I/O devices (including but not limited to keyboards 1008, displays 1006, pointing devices, and the like) can be coupled to the system either directly (such as via bus 1010) or through intervening I/O controllers (omitted for clarity).

Network adapters such as network interface 1014 are also coupled with the system, in one or more embodiments of the invention, to enable the data processing system to become coupled with other data processing systems or remote printers or storage devices through intervening private or public networks. Modems, cable modem and Ethernet cards are just a few of the currently available types of network adapters.

As noted, embodiments of the present invention may take the form of a computer program product embodied in one or more non-transient machine- or computer-readable medium(s) having computer-readable program code embodied thereon. Any combination of one or more computer-readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1018 is a non-limiting example. More specific examples (a non-exhaustive list) of the computer-readable storage medium would include the following: an electrical connection having one or more wires, a portable computer diskette, a hard disk, RAM, ROM, an erasable programmable read-only memory (EPROM or flash memory), an optical fiber, a portable compact disc read-only memory (CD-ROM), an optical storage device, a magnetic storage device, or any suitable combination of the foregoing. In one or more embodiments, a computer-readable storage medium is any tangible medium that can contain or store a program for use by or in connection with an instruction execution system, apparatus, or device.

Computer program code for carrying out operations according to one or more embodiments of the invention are written in any combination of one or more programming languages, including an object-oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program code, in one or more embodiments, is loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing functions/acts specified in the flowchart and/or block diagram block or blocks.

The block diagrams in the figures depict illustrative architectures, functionality, and operation of implementations of systems, methods and computer program products according to embodiments of the present invention. In this regard, each block shown in the block diagrams may represent a module, segment, or portion of code, which comprises one or more executable instructions for implementing specified functions.

It should also be noted that, in one or more embodiments, functions represented by the blocks may occur out of the order noted in the figures. For example, two blocks shown in succession may, in fact, be executed substantially concurrently, or the blocks may sometimes be executed in the reverse order, depending upon the functionality involved. It will also be appreciated that each block of the block diagrams, and combinations of blocks in the block diagrams, can be implemented by special purpose hardware-based systems that perform the specified functions or acts, or combinations of special purpose hardware and computer instructions.

It should be understood that any of the methods described herein can include an additional step of providing a system comprising distinct software modules embodied on a non-transient computer-readable storage medium; the modules include, in one or more embodiments, any or all of the elements depicted in the block diagrams and/or described herein; by way of example and not limitation, a fractional delay filtering module and a correlation module. The method steps can then be carried out using the distinct software modules and/or sub-modules of the system, executing on one or more hardware processors 1002. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

In an integrated circuit implementation of one or more embodiments of the invention, multiple identical die are typically fabricated in a repeated pattern on a surface of a semiconductor wafer. Each such die may include a device described herein, and may include other structures and/or circuits. The individual dies are cut or diced from the wafer, then packaged as integrated circuits. One skilled in the art would know how to dice wafers and package die to produce integrated circuits. Any of the exemplary circuits illustrated in the accompanying figures, or portions thereof, may be part of an integrated circuit. Integrated circuits so manufactured are considered part of this invention.

The illustrations of embodiments of the invention described herein are intended to provide a general understanding of the structure of various embodiments, and they are not intended to serve as a complete description of all the elements and features of apparatus and systems that might make use of the structures described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A method for enhancing read performance in a multi-reader two-dimensional magnetic recording system including at least first and second readers, the method comprising:

receiving a first analog read signal from the first reader and a second analog read signal from the second reader;

sampling the first and second analog read signals to generate first and second sampled signals, respectively, each of the first and second sampled signals comprising at least one of an integer component, indicative of a value of a corresponding one of the first and second analog read signals, respectively, at an integer multiple of a corresponding sampling period associated therewith, and a fractional component, indicative of a value of a corresponding one of the first and second analog read signals, respectively, at an arbitrary point in time between integer multiples of the corresponding sampling period;

wherein sampling each of the first and second input signals includes:

converting at least the first analog read signal to a first digital signal having a first sampling period associated therewith;

interpolating the first digital signal using an interpolation filter, the interpolation filter receiving, at a first input, sequential phase inputs, and receiving, at a second input, a readback signal from the first reader, the interpolation filter being operative to generate a plurality of interpolation signals, each of the interpolation signals being generated during a given interpolation period as a function of a corresponding one of the phase inputs used during the given interpolation period; and combining at least one of the integer and fractional components of the respective first and second sampled signals to thereby generate a reader offset estimation signal for enhancing read performance in the multi-reader two-dimensional magnetic recording system.

2. The method of claim 1, wherein each of the first and second sampled signals comprises the integer component and the fractional component, and wherein the step of combining comprises combining the integer and fractional components of the respective first and second sampled signals to thereby increase an accuracy of the reader offset estimation signal.

3. The method of claim 1, wherein interpolating the first digital signal is performed in parallel for a plurality of phase values to which the first analog read signal is to be interpolated.

4. The method of claim 1, wherein the steps of sampling and combining comprise:
   correlating a first readback signal from the first reader and a second readback signal from the second reader and generating a correlated signal as a function of the first and second readback signals; and
   iteratively performing fractional delay filtering on the correlated signal, a number of iterations of the fractional delaying filtering corresponding to a number of phase values used in the fractional delay filtering.

5. The method of claim 1, further comprising delaying the second sampled signal, an amount of delay being controlled as a function of the reader offset estimation signal.

6. The method of claim 1, wherein the step of combining comprises selecting a signal path having a largest correlation peak value among a plurality of phase values to which the first analog read signal is to be interpolated.

7. A reader offset estimation apparatus for enhancing read performance in a multi-reader two-dimensional magnetic recording system including at least first and second readers, the reader offset estimation apparatus comprising:
   at least one interpolation filter, the at least one interpolation filter receiving a first digital signal indicative of a first analog read signal from the first reader and a second digital signal indicative of a second analog read signal from the second reader, each of the first and second digital signals being indicative of a value of the first and second analog read signals, respectively, at an integer multiple of a corresponding sampling period associated therewith, the at least one interpolation filter being operative to generate first and second interpolated signals, each of the first and second interpolated signals being indicative of a value of the first and second digital signals, respectively, at an arbitrary point in time between integer multiples of the corresponding sampling period; and
   at least one correlator coupled with the at least one interpolation filter, the at least one correlator being operative to combine at least one of the first and second interpolated signals and the first and second digital signals to thereby generate a reader offset estimation signal for enhancing read performance in the multi-reader two-dimensional magnetic recording system.

8. The apparatus of claim 7, wherein the at least one interpolation filter comprises a fractional delay filter.

9. The apparatus of claim 8, wherein the fractional delay filter is operative to sequentially interpolate the first analog read signal for a plurality of phase values to which the first analog signal is to be interpolated to thereby generate a plurality of corresponding fractional components, each of the fractional components being generated during a given interpolation period as a function of a corresponding one of the phase values used during the given interpolation period.

10. The apparatus of claim 9, further comprising a buffer operative to store at least a subset of the plurality of fractional components generated by the fractional delay filter.

11. The apparatus of claim 7, wherein the at least one interpolation filter comprises a plurality of interpolation filters, each of the interpolation filters receiving, at a first input, a corresponding value of a phase to which the first analog read signal is to be interpolated, and receiving, at a second input, a readback signal from the first reader.

12. The apparatus of claim 11, wherein the at least one correlator comprises a plurality of correlators, each of the plurality of correlators being coupled with a corresponding one of the plurality of interpolation filters, each of the plurality of correlators receiving, at a first input, an interpolation signal generated by the corresponding one of the interpolation filters, and receiving, at a second input, a readback signal from the second reader.

13. The apparatus of claim 7, wherein the at least one correlation filter is operative to correlate a first readback signal from the first reader and a second readback signal from the second reader and to generate a correlated signal as a function of the first and second readback signals, and wherein the at least one correlator is operative to iteratively perform fractional delay filtering on the correlated signal, a number of iterations of the fractional delaying filtering corresponding to a number of phase values used in the fractional delay filtering.

14. The apparatus of claim 7, further comprising first and second analog-to-digital converters, the first analog-to-digital converter being operative to receive the first analog read signal and to generate the first digital signal, the second analog-to-digital converter being operative to receive the second analog read signal and to generate the second digital signal.

15. The apparatus of claim 7, further comprising a delay compensation module coupled in a signal path of the second reader, the delay compensation module being operative to receive the second digital signal and to generate a delayed version of the second digital signal, an amount of delay added to the second digital signal by the delay compensation module being controlled as a function of the reader offset estimation signal.

16. A method for enhancing read performance in a multi-reader two-dimensional magnetic recording system including at least first and second readers, the method comprising:
   receiving a first analog read signal from the first reader and a second analog read signal from the second reader;
   sampling the first and second analog read signals to generate first and second sampled signals, respectively, each of the first and second sampled signals comprising at least one of an integer component, indicative of a value of a corresponding one of the first and second analog read signals, respectively, at an integer multiple of a corresponding sampling period associated therewith, and a fractional component, indicative of a value of a corresponding one of the first and second analog read signals, respectively, at an arbitrary point in time between integer multiples of the corresponding sampling period;
   wherein interpolating the first digital signal is performed sequentially for a plurality of phase values to which the first analog read signal is to be interpolated to thereby generate a plurality of corresponding fractional components, each of the fractional components being generated during a given interpolation period as a function of a corresponding one of the phase values used during the given interpolation period; and combining at least one of the integer and fractional components of the respective first and second sampled signals to thereby generate a reader offset estimation signal for enhancing read performance in the multi-reader two-dimensional magnetic recording system.

17. The method of claim 16, further comprising storing at least a subset of the plurality of fractional components generated by the interpolating step.

18. A method for enhancing read performance in a multi-reader two-dimensional magnetic recording system including at least first and second readers, the method comprising:
receiving a first analog read signal from the first reader and a second analog read signal from the second reader;
sampling the first and second analog read signals to generate first and second sampled signals, respectively, wherein sampling each of the first and second input signals includes:
converting at least the first analog read signal to a first digital signal having a first sampling period associated therewith;
interpolating the first digital signal using a plurality of interpolation filters, wherein each of the interpolation filters receiving, at a first input, a corresponding value of a phase to which the first analog read signal is to be interpolated, and receiving, at a second input, a readback signal from the first reader, and wherein interpolating the first digital signal yields the fractional component indicative of the value of the first analog read signal at an arbitrary point in time between integer multiples of the first sampling period;
wherein each of the first and second sampled signals comprising at least one of an integer component, indicative of a value of a corresponding one of the first and second analog read signals, respectively, at an integer multiple of a corresponding sampling period associated therewith, and a fractional component, indicative of a value of a corresponding one of the first and second analog read signals, respectively, at an arbitrary point in time between integer multiples of the corresponding sampling period; and
combining at least one of the integer and fractional components of the respective first and second sampled signals to thereby generate a reader offset estimation signal for enhancing read performance in the multi-reader two-dimensional magnetic recording system.

19. The method of claim 18, wherein combining the at least one of the integer and fractional components of the respective first and second sampled signals includes providing a plurality of correlators, each of the plurality of correlators being coupled with a corresponding one of the plurality of interpolation filters, each of the plurality of correlators receiving, at a first input, an interpolation signal generated by the corresponding one of the interpolation filters, and receiving, at a second input, a readback signal from the second reader.

20. A method for enhancing read performance in a multi-reader two-dimensional magnetic recording system including at least first and second readers, the method comprising:
receiving a first analog read signal from the first reader and a second analog read signal from the second reader;
sampling the first and second analog read signals to generate first and second sampled signals, respectively, each of the first and second sampled signals comprising at least one of an integer component, indicative of a value of a corresponding one of the first and second analog read signals, respectively, at an integer multiple of a corresponding sampling period associated therewith, and a fractional component, indicative of a value of a corresponding one of the first and second analog read signals, respectively, at an arbitrary point in time between integer multiples of the corresponding sampling period;
combining at least one of the integer and fractional components of the respective first and second sampled signals to thereby generate a reader offset estimation signal for enhancing read performance in the multi-reader two-dimensional magnetic recording system; and
wherein the steps of sampling and combining comprise: correlating a first readback signal from the first reader and a second readback signal from the second reader and generating a correlated signal as a function of the first and second readback signals; and iteratively performing fractional delay filtering on the correlated signal, a number of iterations of the fractional delaying filtering corresponding to a number of phase values used in the fractional delay filtering.

21. A method for enhancing read performance in a multi-reader two-dimensional magnetic recording system including at least first and second readers, the method comprising:
receiving a first analog read signal from the first reader and a second analog read signal from the second reader;
sampling the first and second analog read signals to generate first and second sampled signals, respectively, each of the first and second sampled signals comprising at least one of an integer component, indicative of a value of a corresponding one of the first and second analog read signals, respectively, at an integer multiple of a corresponding sampling period associated therewith, and a fractional component, indicative of a value of a corresponding one of the first and second analog read signals, respectively, at an arbitrary point in time between integer multiples of the corresponding sampling period;
combining at least one of the integer and fractional components of the respective first and second sampled signals to thereby generate a reader offset estimation signal for enhancing read performance in the multi-reader two-dimensional magnetic recording system; and
delaying the second sampled signal, an amount of delay being controlled as a function of the reader offset estimation signal.

22. A method for enhancing read performance in a multi-reader two-dimensional magnetic recording system including at least first and second readers, the method comprising:
receiving a first analog read signal from the first reader and a second analog read signal from the second reader;
sampling the first and second analog read signals to generate first and second sampled signals, respectively, each of the first and second sampled signals comprising at least one of an integer component, indicative of a value of a corresponding one of the first and second analog read signals, respectively, at an integer multiple of a corresponding sampling period associated therewith, and a fractional component, indicative of a value of a corresponding one of the first and second analog read signals, respectively, at an arbitrary point in time between integer multiples of the corresponding sampling period;
combining at least one of the integer and fractional components of the respective first and second sampled signals to thereby generate a reader offset estimation signal for enhancing read performance in the multi-reader two-dimensional magnetic recording system, wherein combining the at least one of the integer and fractional components of the respective first and second sampled signals includes selecting a signal path having a largest correlation peak value among a plurality of phase values to which the first analog read signal is to be interpolated.

* * * * *